US010182527B2

(12) United States Patent
Jespersen

(10) Patent No.: US 10,182,527 B2
(45) Date of Patent: Jan. 22, 2019

(54) MOWER AND SWATHING UNIT

(71) Applicant: Kverneland Group Kerteminde A/S, Kerteminde (DK)

(72) Inventor: Peter Jespersen, Vejen (DK)

(73) Assignee: Kverneland Group Kerteminde A/S, Kerteminde (DK)

(*) Notice: Subject to any disclaimer, the term of this patent is extended or adjusted under 35 U.S.C. 154(b) by 331 days.

(21) Appl. No.: 14/782,917

(22) PCT Filed: Apr. 3, 2014

(86) PCT No.: PCT/EP2014/056667
§ 371 (c)(1),
(2) Date: Oct. 7, 2015

(87) PCT Pub. No.: WO2014/166802
PCT Pub. Date: Oct. 16, 2014

(65) Prior Publication Data
US 2016/0029560 A1 Feb. 4, 2016

(30) Foreign Application Priority Data
Apr. 11, 2013 (EP) .................. 13163432

(51) Int. Cl.
*A01D 43/00* (2006.01)
*A01D 61/00* (2006.01)
(Continued)

(52) U.S. Cl.
CPC .......... *A01D 61/004* (2013.01); *A01D 34/66* (2013.01); *A01D 34/668* (2013.01); *A01D 34/71* (2013.01); *A01D 57/30* (2013.01)

(58) Field of Classification Search
CPC .... A01D 34/664; A01D 34/66; A01D 34/667; A01D 34/81; A01D 61/004
(Continued)

(56) References Cited

U.S. PATENT DOCUMENTS 2,484,981 A 10/1949 Coultas
3,324,639 A 6/1967 Halls et al.
(Continued)

FOREIGN PATENT DOCUMENTS

DE 1810878 C2 7/1984
DE 29614199 U1 10/1996
(Continued)

OTHER PUBLICATIONS

U.S. Appl. No. 14/906,736.
(Continued)

*Primary Examiner* — Thomas B Will
*Assistant Examiner* — Mai T Nguyen
(74) *Attorney, Agent, or Firm* — Knobbe, Martens, Olson & Bear, LLP

(57) ABSTRACT

A mower has a plurality of rotary cutters for cutting a crop and a swathing unit for forming a cut crop into a swath. In some embodiments, the swathing unit includes an auger and a housing that extends around at least part of the auger and provides a swathing aperture through which cut crop material is ejected to form a swath. In some embodiments, the housing includes at least one guide plate that can be adjusted to adjust the width W of the swathing aperture.

18 Claims, 8 Drawing Sheets

(51) Int. Cl.
*A01D 34/66* (2006.01)
*A01D 34/71* (2006.01)
*A01D 57/30* (2006.01)

(58) Field of Classification Search
USPC .................. 56/14.4, 14.5, 153, 192, 189
See application file for complete search history.

(56) References Cited

U.S. PATENT DOCUMENTS

| | | | |
|---|---|---|---|
| 3,479,805 | A | 11/1969 | Soteropulos |
| 3,717,981 | A | 2/1973 | Van der Lely |
| 3,841,070 | A | 10/1974 | Cicci et al. |
| 4,330,982 | A | 5/1982 | Vissers et al. |
| 4,392,339 | A | 7/1983 | Berlivet et al. |
| 4,550,554 | A * | 11/1985 | Lundahl .............. A01D 34/412 56/121.42 |
| 4,739,609 | A | 4/1988 | Meier et al. |
| 5,076,042 | A | 12/1991 | Koorn et al. |
| 5,778,647 | A | 7/1998 | McLean et al. |
| 5,901,541 | A | 5/1999 | Lindquist |
| 5,930,988 | A | 8/1999 | Hanson |
| 6,058,688 | A * | 5/2000 | Krambeck .......... A01D 61/008 56/10.2 R |
| 6,093,099 | A | 7/2000 | Groff |
| 6,508,050 | B1 * | 1/2003 | Krone ................ A01D 57/30 56/192 |
| 6,662,539 | B1 | 12/2003 | Adams et al. |
| 6,854,251 | B2 * | 2/2005 | Snider ................ A01D 82/00 56/192 |
| 7,500,341 | B2 | 3/2009 | Hirominus et al. |
| 2001/0003239 | A1 | 6/2001 | Franet |
| 2004/0221562 | A1 | 11/2004 | Snider |
| 2005/0252183 | A1 | 11/2005 | Hirominus et al. |
| 2009/0293439 | A1 | 12/2009 | Phillips |
| 2010/0031622 | A1 | 2/2010 | Frey |
| 2011/0005181 | A1 | 1/2011 | Barnett et al. |
| 2011/0047948 | A1 | 3/2011 | Thompson |
| 2011/0302897 | A1 | 12/2011 | Hoffman et al. |
| 2016/0029560 | A1 | 2/2016 | Jespersen |
| 2016/0088795 | A1 | 3/2016 | Karlsson |
| 2017/0006760 | A1 | 1/2017 | Nielsen |

FOREIGN PATENT DOCUMENTS

| | | |
|---|---|---|
| EP | 0061818 A1 | 10/1982 |
| EP | 0558437 A1 | 9/1993 |
| EP | 0593377 A1 | 4/1994 |
| EP | 0945051 B1 | 7/2003 |
| EP | 1389413 A2 | 2/2004 |
| EP | 1321027 B1 | 2/2008 |
| EP | 2789224 A1 | 10/2014 |
| GB | 1597276 A | 9/1981 |
| GB | 2088684 A | 6/1982 |
| WO | WO 01/03494 A1 | 1/2001 |
| WO | WO 2014/166802 A1 | 10/2014 |
| WO | WO 2015/010808 A1 | 1/2015 |
| WO | WO 2015/097230 A1 | 7/2015 |

OTHER PUBLICATIONS

European Search Report in corresponding European Patent Application No. EP 13163432, dated Sep. 9, 2013, in 6 pages.
International Search Report from International Patent Application No. PCT/EP2014/056667, dated Jun. 30, 2014, in 2 pages.
Notice of Opposition received in related European Patent No. EP 2789224, dated Mar. 3, 2016, in 14 pages.
Kverneland's Response to Notice of Opposition in related European Patent No. EP 2789224, dated Sep. 12, 2016, in 9 pages.
Preliminary Opinion from the European Patent Office Opposition Division received in related European Patent No. 2789224, dated Feb. 14, 2017, in 5 pages.
Pottinger's Further Arguments received in related European Patent No. 2789224, dated Oct. 6, 2017, in 29 pages.
Krone, "BiG M420 SP high-performance mower conditioner" Brochure and Technical Data, Feb. 2016, in 28 pages.
Krone, "BiG M420 Selbstfahrender Hochleistungs-Mahaufbereiter" Brochure and Technical Data, Oct. 2011, in 28 pages.
Krone, "BiG M II Heavy-Duty Mower Conditioner" Brochure, Jan. 2008, in 20 pages.
Krone, "BiG M II Hochleistungs-Mahaufbereiter" Brochure, Oct. 2005, in 20 pages.
Krone, "BiG M 500 High-capacity SP mower conditioner" Brochure and Technical Data, Nov. 2011, in 24 pages.
Krone, "BiG M 500 Selbstfahrender Hochleistungs-Mahaufbereiter" Brochure and Technical Data, Oct. 2011, in 24 pages.

* cited by examiner

MOWER AND SWATHING UNIT

CROSS REFERENCE

This application is a U.S. National Phase of PCT International Application No. PCT/EP2014/056667, filed Apr. 3, 2014 and published as WO 2014/166802 on Oct. 16, 2014, which claims priority to European Application No. 13163432.1, filed Apr. 11, 2013. The entire disclosure of each of the above-identified applications is hereby incorporated by reference.

BACKGROUND

Field

The present disclosure relates to a mower and swathing unit. In particular but not exclusively it relates to a plain mower having a plurality of rotary cutter heads for cutting a crop and a swathing unit for forming the cut crop into a swath for collection.

Certain Related Art

A known mower has a plurality of rotating cutter heads, a conditioning unit and a swathing unit comprising an auger device that brings the cut material together into a swath that is deposited on the ground for drying and collecting. The conditioning unit comprises a rotating bar equipped with a plurality of flail arms that crush and bruise the stalks of the crop to aid wilting. The conditioning unit is located immediately behind the cutter heads and rotates upwards (that is, the front part of the conditioning unit in the mowing direction rotates upwards) to carry the cut crop upwards and over the rotary axis of the conditioning unit.

The auger is located behind the conditioning unit and has a helical flighting that transports the cut crop towards one end of the mower to form a swath that is narrower than the full width of the mower. The auger is enclosed within a housing having an opening at one end through which the swath passes. The auger rotates upwards and the cut crop passes over the rotary axis of the auger.

If a narrow swath is not required a guide plate in the upper part of the housing may be opened to allow the cut material to pass over the top of the auger and fall onto the ground without being formed into a swath. This results in wide spreading of the cut crop, which allows the material to dry more rapidly. Once the material has dried it can be raked into a swath and collected in a conventional manner.

The known mower can therefore be configured to produce either wide spreading of the crop for fast drying or a narrow swath for easier collection. However, the machine can only be configured to produce either a narrow swath or wide spreading of the crop—it is not possible to adjust the width of the swath according to the quantity of the cut crop material and other factors such as its moisture content.

As previously mentioned, the known mower includes a conditioning unit between the rotary cutter heads and the auger. As well as conditioning the cut crop, the conditioning unit also picks up the cut crop from the cutter heads and transfers it to the auger. However, conditioning is not always required and driving a conditioner requires a high power input (typically about 50% of the total power requirement for a combined mower/conditioner). In a plain mower the conditioning unit is omitted to reduce the cost and the power consumption of the machine. This also allows a smaller and less powerful tractor to be used.

In the known mower, the cut crop is lifted over the rotary axes of the conditioning unit and the auger. Lifting a heavy crop continuously requires a significant input of energy, which reduces the efficiency of the machine. Other prior art mowers are also known in which the auger rotates downwards so that the crop passes beneath the auger.

SUMMARY

It is an object of the present disclosure to provide a mower having a swathing unit for forming the cut crop into a swath, which mitigates one or more of the aforesaid problems.

According to one aspect of the present disclosure, there is provided a mower having a plurality of rotary cutters for cutting a crop and a swathing unit for forming a cut crop into a swath, wherein the swathing unit includes an auger and a housing that extends around at least part of the auger and provides a swathing aperture through which cut crop material is ejected to form a swath, wherein the housing includes at least one guide plate that can be adjusted to adjust the width of the swathing aperture.

The swathing unit allows the cut crop to be collected into a swath and the adjustable guide plate or plates make it possible to adjust the width of the swath according to the nature of the cut crop. For example, if the crop requires a high level of drying before being collected it can be laid in a wide swath to promote rapid drying. On the other hand, if only a relatively small degree of drying is required, the crop can be laid in a narrow swath for easier and quicker collection without, for example, the need for a further raking operation. The efficiency of swathing and collection of the crop can therefore be increased. Furthermore, the use of an adjustable guide plate (or a plurality of adjustable guide plates) allows the swathing width to be adjusted using a very simple mechanical arrangement, which is easy for an operator to adjust and also does not add greatly to the cost of the mower. Preferably, the swathing unit includes a plurality of guide plates.

Advantageously, the guide plate is located beneath and behind the auger. Preferably, the guide plate extends around approximately 20%-50% of the circumference of the auger. We have found that this position and size of the guide plate enables efficient control of the swathing unit.

Advantageously, the guide plate can be adjusted laterally to adjust the width of the swathing aperture. This provides a simple and efficient mechanism. Alternatively, a modified mechanism may be provided in which the guide plate pivots about an upright axis.

In a preferred embodiment the guide plate is manually adjustable and includes a manually-operable locking mechanism. The manually adjustable mechanism is very easy to operate and avoids the need for a mechanical actuator. It therefore provides an effective and low cost solution to the controlling the swathing width.

The guide plate preferably includes a pivot mechanism located beneath the auger and a locking mechanism located behind the auger. We have found that this arrangement is effective and mechanically simple.

In another preferred embodiment the mower includes an actuator that adjusts the position of the guide plate. This allows the position of the guide plate to be adjusted remotely, for example from the cab of a tractor. It is also possible in this case for the width of the swathing aperture to be adjusted automatically by an electronic control system.

In one embodiment, the position of the guide plate is adjustable in discrete steps. Alternatively, the position of the guide plate may be continuously adjustable. This allows a finer degree of control over the width of the swathing aperture.

Advantageously, the guide plate is removable to provide wide spreading of the cut crop, wherein the width of the swath is at least 50% of the mower working width. Preferably, the width of the swath during wide spreading is at least 60%, more preferably at least 70%, of the mower working width. This allows for very rapid drying of the cut crop, which may be required for example if rain has fallen during or shortly before the crop cutting operation. Once the crop has dried it may be collected into a swath using a conventional raking apparatus.

The mower may include mounting means for mounting the guide plate or plates in a non-operation position after removal. This allows the guide plates to be transported with the mower, so that they are always available when required.

Advantageously, the auger is configured such that a front part of auger rotates downwards and the cut crop passes under the rotary axis of the auger. We have found that a downwards rotating auger is able to collect the cut crop efficiently from the rotating cutter heads and then shift it laterally to form a swath. Further, because the crop is not lifted over the auger less power is required to drive the auger. The energy efficiency of the swathing unit is therefore improved.

According to another aspect of the disclosure, there is provided a mower having a plurality of rotary cutters for cutting a crop and a swathing unit for forming a cut crop into a swath, wherein the swathing unit includes an auger and a housing that extends around at least part of the auger, the housing provides a swathing aperture through which cut crop material is ejected to form a swath, and the auger is configured such that a front part of auger rotates downwards and the cut crop passes under the rotary axis of the auger.

This provides the advantages identified above. Specifically, the downwards rotating auger is able to collect the cut crop efficiently from the rotating cutter heads and then shift it laterally to form a swath, and because the crop is not lifted over the auger less power is required to drive the auger. The energy efficiency of the swathing unit is therefore improved.

Advantageously, the auger includes at least one flighting that rotates to shift a cut crop laterally with respect to a mowing direction. Advantageously, the auger is located above and behind the cutter heads, and a front edge of the flighting is located in a transverse vertical plane that extends through the cutter heads. By positioning the auger very close to the cutter heads, so that the front edge of the flighting overlaps with the rotary cutter heads, efficient collection of the cut crop from the cutter heads is ensured.

Advantageously, the auger includes one or more ejector plates that eject cut crop from the auger through the swathing aperture. This ensures that the cut crop is ejected efficiently through the swathing aperture.

Optionally, the auger includes one or more adjustable and/or removable ejector plates. The adjustable ejector plate or plates can be set so that their positions match the width of the swathing aperture, to ensure that the cut crop is ejected with maximum efficiency.

Advantageously, the auger is configured to be driven continuously with the rotary cutter heads. This avoids the need for a disconnect mechanism, which therefore avoids unnecessary cost. Furthermore, by driving the auger continuously, even when the guide plates have been removed and the cut crop is not being collected into a narrow swath, blockages can be prevented thereby ensuring reliable operation. Very little power is required to drive the auger when it is not causing the cut crop to be translated laterally. The energy efficiency of the mower is therefore hardly affected by driving the auger continuously.

In one embodiment, the swathing aperture is located substantially centrally between the ends of the swathing unit and the auger is configured to draw the cut crop inwards from the ends of the swathing unit towards the swathing aperture to produce a central swath. This arrangement may be useful for example on a front-mounted mower unit, or on rear-mounted or trailed mower units.

In another embodiment, the swathing aperture is located adjacent a first end of the swathing unit and the auger is configured to draw the cut crop from a second end of the swathing unit towards the swathing aperture. This arrangement may be useful for example on a side-mounted or rear-mounted mower unit, or a trailed mower unit.

SUMMARY

An embodiment of the disclosure will now be described by way of example with reference to the accompanying drawings, wherein.

DETAILED DESCRIPTION OF CERTAIN EMBODIMENTS

Figure 1:
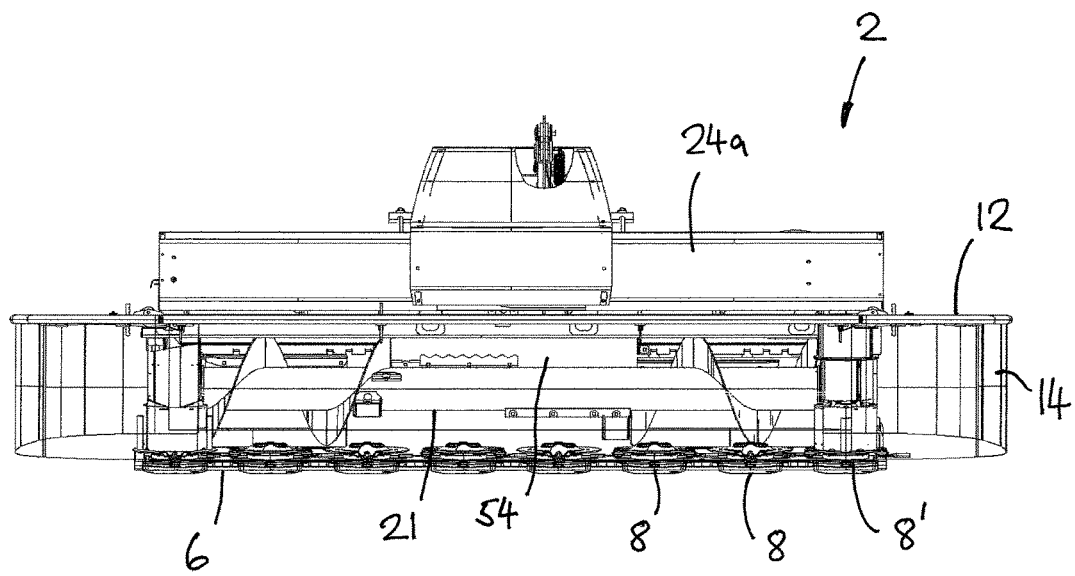
FIG. 1 is a front view of a mower.
Figure 2:
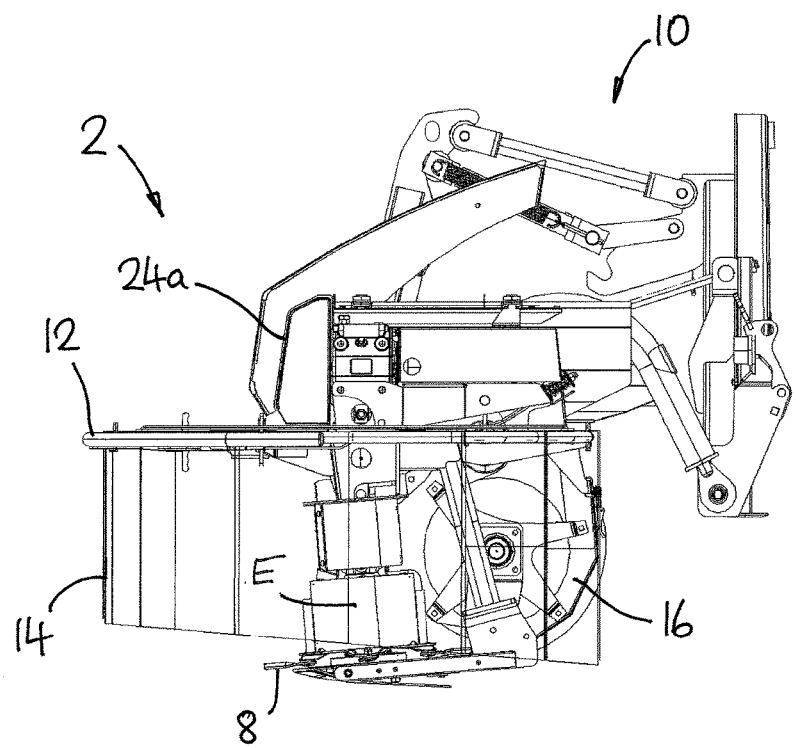
FIG. 2 is a sectional side view from the left-hand end of the mower (seen in the mowing direction)
Figure 3:
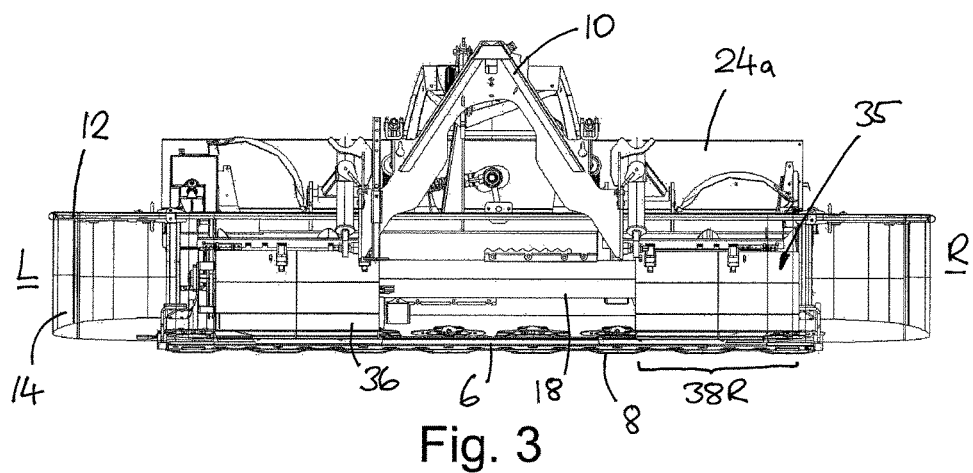
FIG. 3 is a rear view of the mower.

The mower shown in the drawings is a front mower that is designed to be mounted on the front of a tractor and is configured to produce a central swath that passes between the wheels of the tractor. It should be understood that the invention is not restricted to a front mower unit and is applicable to other types of mower unit including for example rear mounted mower units or side mounted units. Also, the invention is not restricted to mower units that produce only a central swath and is applicable also to mower units that produce a swath at one or both ends of the swathing unit. Also, the invention is applicable to mower units that are either suspended from a tractor or supported on wheels (for example towed mower units).

Figure 4:
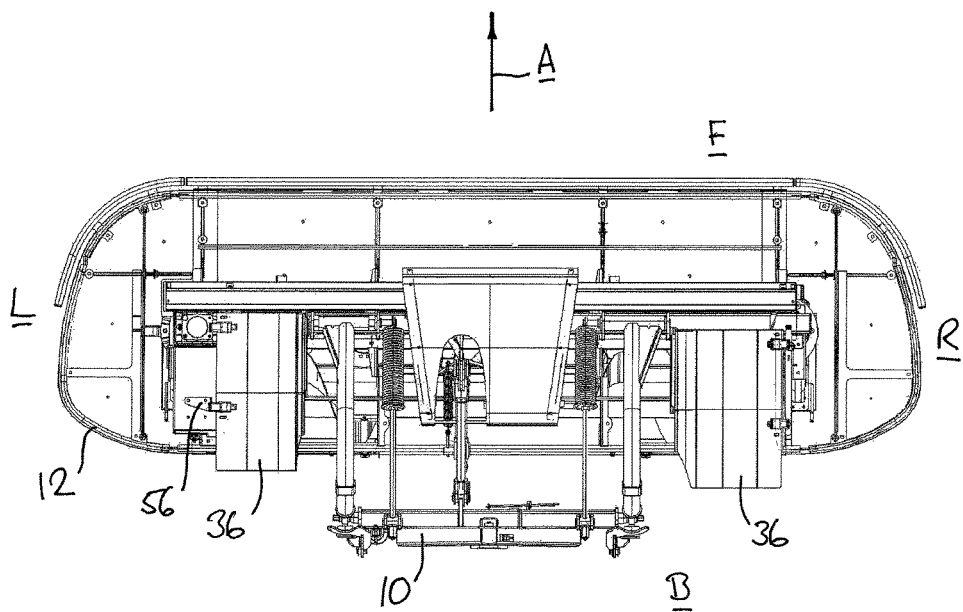
FIG. 4 is a top view of the mower.

In the following description we refer to the front F and back B (or rear) of the mower unit, which are defined with respect to the mowing direction A, as illustrated in FIG. 4. Terms such as "in front of" or "behind" are intended to be interpreted in a sense that is consistent with this definition of the terms "front" and "back". We also refer to the left L and right R ends of the mower unit, which are defined from the point of view of an observer facing in the mowing direction A.

The mower unit 2 shown in the drawings comprises a support frame 4 that supports a cutter bar 6 carrying a plurality of rotary cutter heads 8, for example conventional cutter discs or cutter drums equipped with knives. In this embodiment the cutter bar 6 carries eight cutter heads 8, wherein the two outermost cutter heads 8' are drum cutters and the remaining cutters 8 are disc cutters.

The cutter bar 6 extends parallel to the ground and perpendicular to the mowing direction A. The cutter heads 8 are driven in a conventional manner from the power take-off (PTO) of the tractor and in this embodiment they rotate alternately in opposite directions about rotation axes E that are normally inclined slightly forwards in the mowing direction A. In alternative embodiments the rotational directions of the cutter heads may be different. The mower unit 2 also includes a suspension unit 10 through which the mower unit is attached to the front of a tractor. The mower unit also includes a support frame 12 for a protective cover 14 in the form of a skirt.

Mounted behind the cutter bar 6 is a swathing unit 15 that includes an auger 16, comprising a rotary shaft 18 that carries one or more helical flightings 20. In this embodiment the auger 16 carries two opposite-handed flightings 20 that extend inwards from the ends of the auger 16. Each of these flightings 20 has a length equal to approximately 30% the length of the auger, leaving a central portion 21 of the auger that has no flightings. This central portion 21 comprises about 40% the length of the auger.

In this embodiment single flightings 20 are provided, which are configured to draw cut crop material inwards towards the central portion 21. These single flightings 20 have a large pitch so that the auger 16 can be driven at a relatively slow speed, ensuring gentle crop handling. Alternatively, in a different embodiment, multiple flightings may be provided at one or both ends of the auger. In another embodiment one or more flightings may be provided that are configured to draw the cut material towards one or both ends of the auger.

Figure 7:
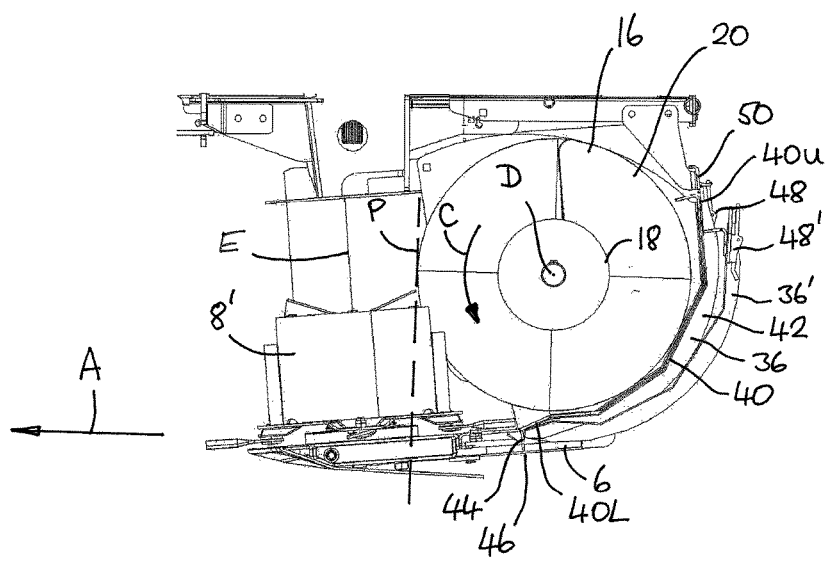
FIG. 7 is a sectional side view of the mower.

The auger 16 is driven so that it rotates downwards: that is, so that the front part of the auger 16 in the mowing direction A rotates downwards as indicated by arrow C in FIG. 7. This ensures that cut material is drawn under the rotary axis D of the auger 16.

The auger 16 is positioned as close as possible to the cutter heads 8 so that it grabs the cut crop quickly to ensure an even flow and good cutting quality. The rotary axis D of the auger is positioned above and behind the cutter heads 8. In this embodiment, the front edges of the flightings 20 are located in a vertical plane P that extends through the rear halves of the cutter heads 8. The lowest edges of the flightings 20 are located just above the knives of the cutter heads 8, as shown in FIG. 7.

Figure 15:
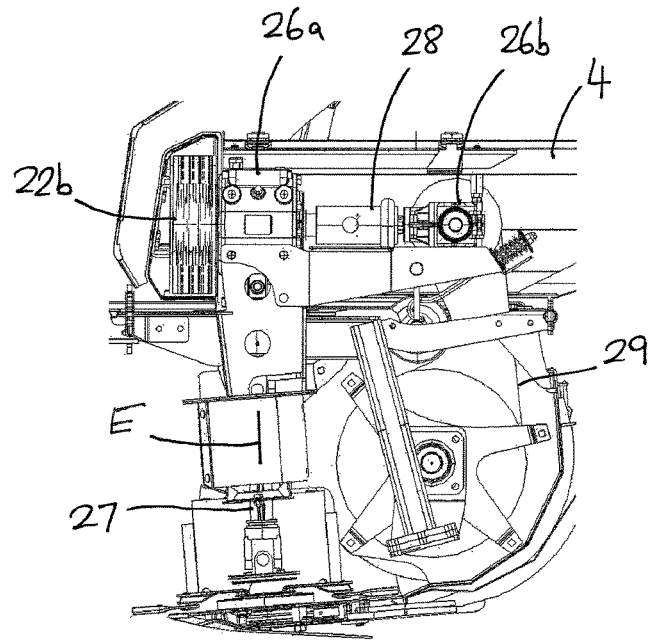
FIG. 15 is a sectional side view of the mower.
Figure 16:
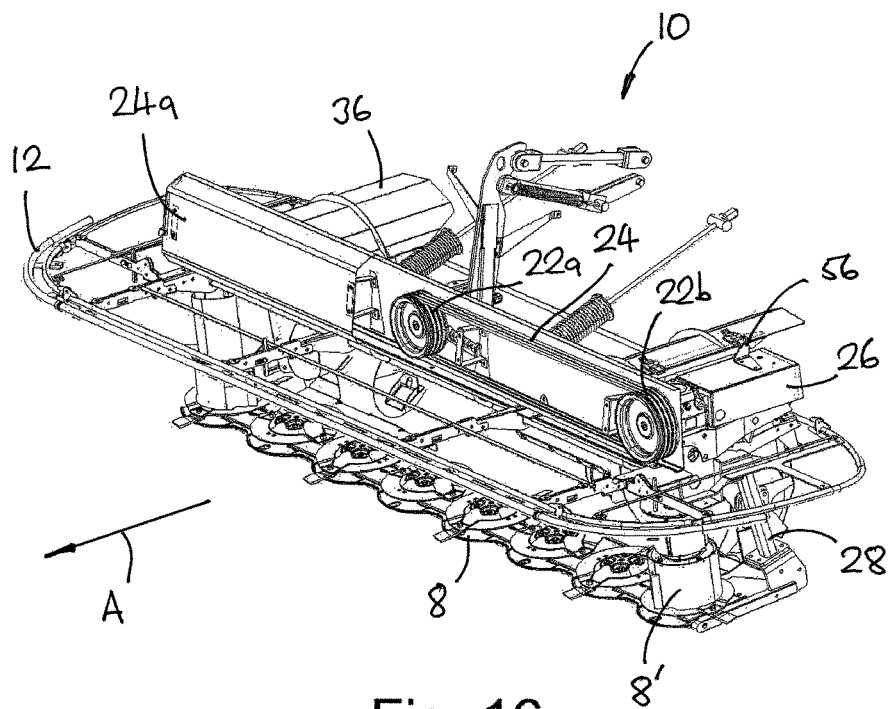
FIG. 16 is an isometric view showing the mower from above and the front.

The rotary cutter heads 8 are driven from the power take-off of the tractor via first and second pulley wheels 22a, 22b, drive belt 24, first gearbox 26a and drive shaft 27 as shown in FIGS. 15 and 16. The auger 16 is also driven from the first gearbox 26a via drive shaft 28, second gearbox 26b and drive belt 29. The pulley wheels 22a, 22b are of different diameters and their positions can be swapped to adjust the drive speed of the cutter heads 8 and the auger 16, which can therefore be configured for either high speed operation for example at 1000 rpm or low speed energy-saving operation at for example 775 rpm. The drive belt 24 and the pulley wheels 22a, 22b are protected by a guard plate 24a.

In this embodiment there is no mechanism for disconnecting the drive from the auger 16. The auger 16 is therefore configured to be driven continuously with the rotary cutter heads 8. Alternatively, a disconnect mechanism, for example a clutch, may be provided for disconnecting drive from the auger 16.

Figure 5:
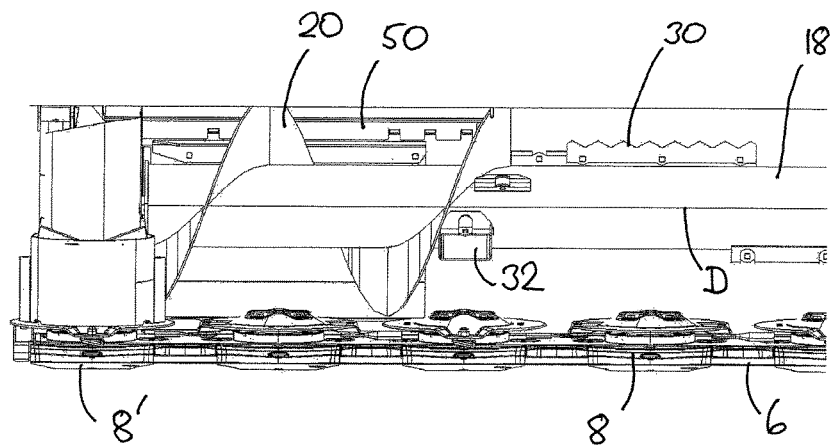
FIG. 5 is a front view of the mower showing at an enlarged scale details of the right-hand end of the mower.
Figure 6:
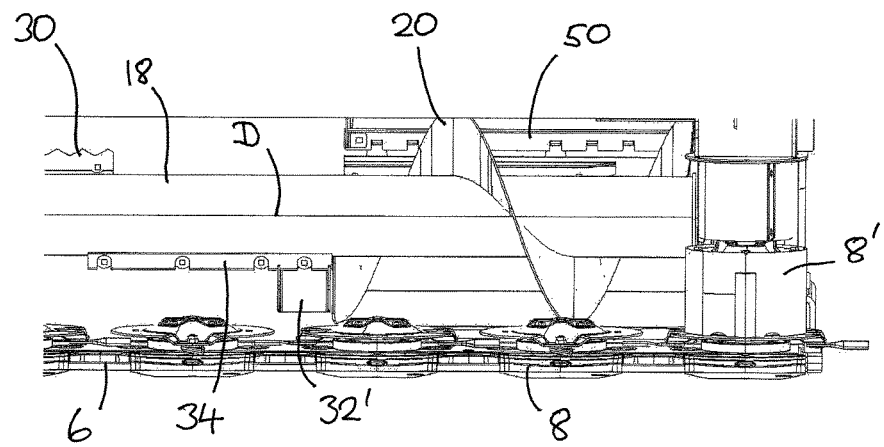
FIG. 6 is a front view showing at an enlarged scale details of the left-hand end of the mower.

The auger 16 carries on the rotary shaft 18 one or more sets of fixed ejector plates 30 as shown most clearly in FIGS. 5 and 6, which are configured to eject cut material outwards from the auger 16 in the central portion 21. Optionally, the auger 16 may also include one or more adjustable ejector plates 32 that are removably attached to mounting flanges 34 adjacent the inner ends of the flightings 20. The axial positions of these adjustable ejector plates 32 can be adjusted by attaching the plates to the flanges 34 in a number of different positions. For example, the adjustable ejector plates 32 can be attached to the auger 16 in axially outwardly disposed locations as shown in FIG. 5, or the adjustable ejector plates 32' can be attached to the auger 16 in axially inwardly disposed locations as shown in FIG. 6.

The swathing unit 15 also includes a housing 35 comprising one or more sets of guide plates 36 that hold the cut crop in contact with the auger 16 so that rotation of the auger 16 causes sideways displacement of the crop.

In this embodiment four guide plates 36 are provided, which are arranged in two sets of two plates at opposite ends of the swathing unit 15, comprising a left-hand set of guide plates 38L and a right-hand set of guide plates 38R. Each set of plates 38L, 38R comprises an inner guide plate 36LI, 36RI and an outer guide plate 36LO, 36RO. In each case the inner and outer plates 36LI, 36LO; 36RI, 36RO of each pair abut each other edge-to-edge. Alternatively, the pair of adjacent plates may be arranged to overlap one another.

In this embodiment each guide plate 36 comprises a bent steel plate 40 that extends around the lower and rear parts of the auger 16 from a lower edge 40L below the rotary axis D of the auger 16 to an upper edge 40U behind and somewhat above the rotary axis D. This can be seen most clearly in FIG. 7. Preferably, the guide plate extends around approximately 20%-50% of the circumference of the auger. The guide plate 36 also includes one or more reinforcing ribs 42 that extend around the outer surface of the plate 40 from the lower edge 40L to the upper edge 40U. Alternatively, the bent plates 40 may be replaced by curved plates.

Figure 11:
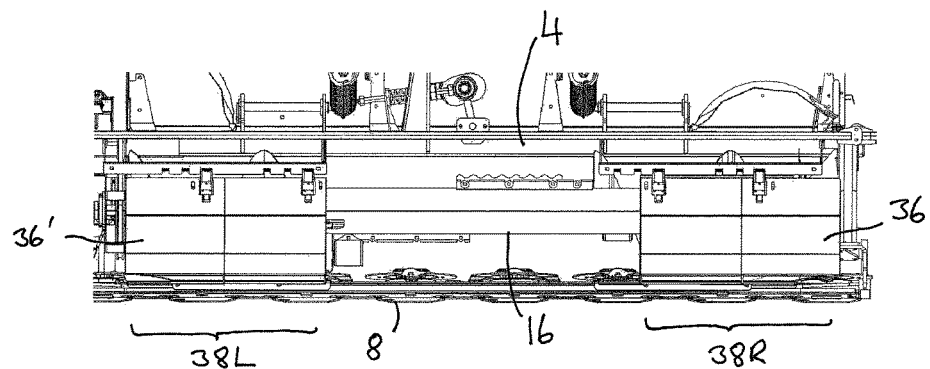
FIG. 11 is a rear view showing additional details of the mower.
Figure 12:
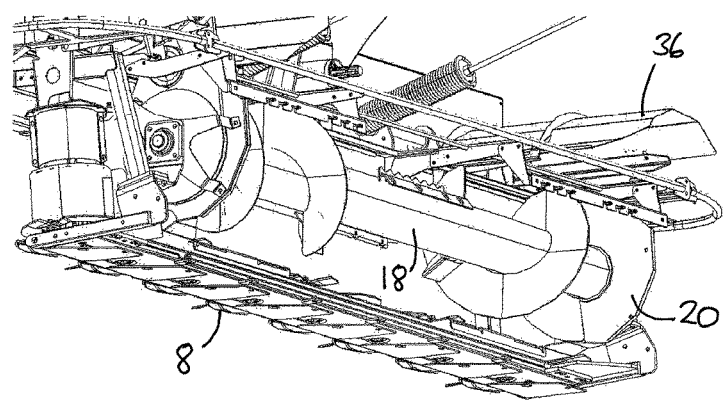
FIG. 12 is an isometric view showing the rear and left-hand end of the mower.
Figure 13:
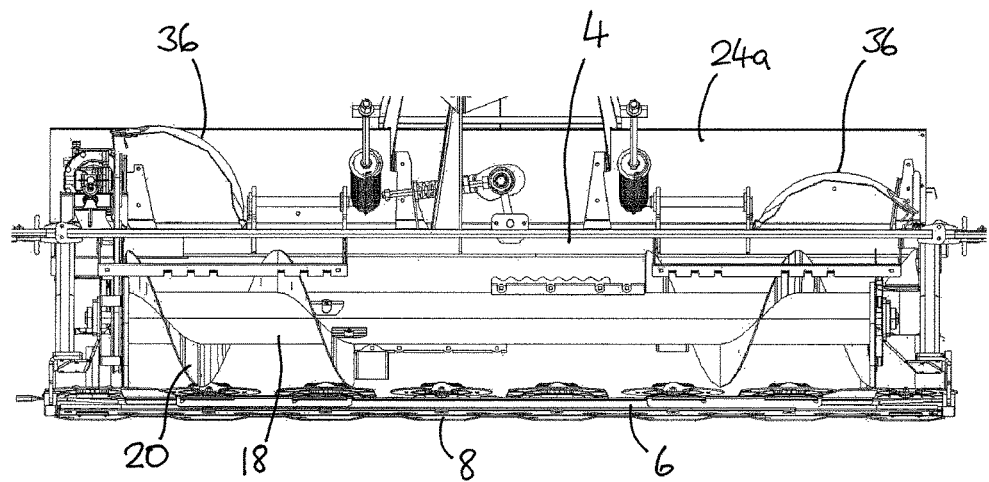
FIG. 13 is a rear view of the mower with the guide plates removed.

At its lower edge 40L the guide plate 36 includes a downwards-extending engagement flange 44 that engages a corresponding locating slot 46 in the rear part of the cutter bar 6. At its upper edge 40U the guide plate 36 includes a releasable locking clamp 48 (e.g. a snap lock) that can be attached to a locking bar 50. By releasing the locking clamp 48 from the locking bar 50 the upper edge 40U of the guide plate 36 can be rotated downwards so that the plate pivots about the locating flange 44. In FIG. 7 the guide plate 36 is shown both in a raised and locked position as indicated by the reference 36, and also in an unlocked and downwardly pivoted position indicated by the reference 36'. When the plate is in the lowered position 36' the locating flange 44 can slide laterally within the locating slot 46, allowing the plate 36 to be adjusted laterally. In FIG. 11 the right-hand set of plates 38R are shown in the locked position 36 and the left-hand set of plates 38L are shown in the unlocked and downwardly pivoted position 36'.

Figure 8:
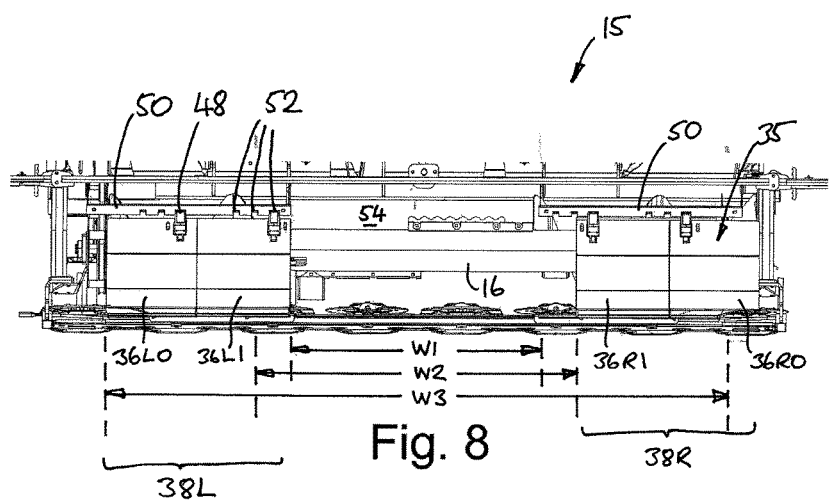
FIG. 8 is a rear view showing additional details of the mower.
Figure 9:
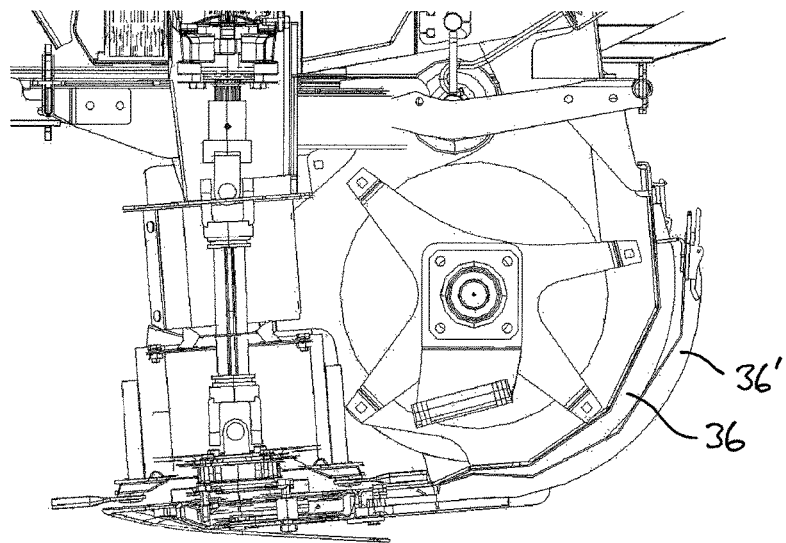
FIG. 9 is a sectional side view of the mower, seen from the left-hand end.
Figure 10:
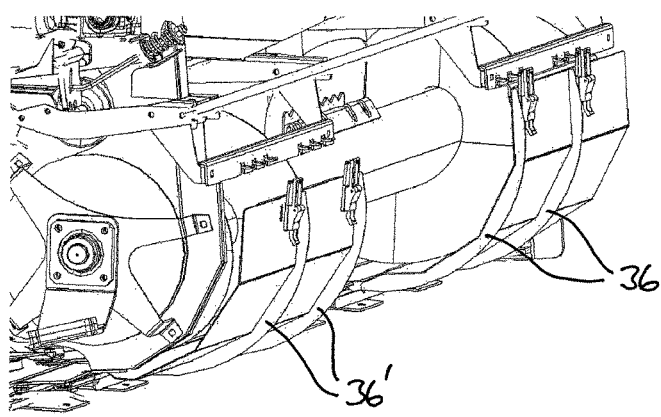
FIG. 10 is an isometric view showing the rear and left-hand end of the mower.

As shown most clearly in FIG. 8, each locking bar 50 has a plurality of locking formations 52 with which the locking clamps 48 can be engaged. In this embodiment three alternative locking formations 52 are provided for each clamp 48, which are spaced 75 mm apart. This allows each guide plate 36 to be attached in any one of three laterally-separated positions, comprising an inner position, a central position and an outer position. In FIG. 8 the left-hand plates 36LO, 36LI are shown in the inner lateral positions and the right-hand plates 36RO, 36RI are shown in the outer lateral positions.

Adjusting the lateral positions of the guide plates 36 is a manual operation that involves undoing the locking clamps 48, pivoting the guide plates 36 downwards and sliding them laterally to the required positions, then lifting the plates and re-engaging the locking clamps 48. No tools are required to complete this operation. It is therefore very simple for the operator to adjust the width and position of the swath as required.

In an alternative embodiment the locking bar 50 may be modified to allow the locking clamps 48 to be attached in any position. This allows the positions of the guide plates 36 and the size of the swathing aperture 54 to be adjusted continuously rather than in discrete steps. Alternatively, the lateral positions of the guide plates 36 can be adjusted mechanically, for example by a hydraulic or electric actuator, or an electric motor. In this case also the lateral positions of the guide plates 36 may be adjusted continuously.

The lateral positions of the guide plates 36 determine the size and position of a swathing aperture 54, shown in FIG. 8, through which the cut crop material is ejected by the auger 16 to form a swath. The width and the position of the swath can therefore be controlled by adjusting the lateral positions of the guide plates 36 so as to adjust the width and the position of the swathing aperture 54. For example, if both sets of guide plates 38L, 38R are located in the inner lateral positions a narrow swath of width W1 will be formed centrally between the ends of the swathing unit 15. If both sets of guide plates 38L, 38R are located in the outer lateral positions a wide swath of width W2 will be formed centrally between the ends of the swathing unit 15. If both sets of guide plates are located in the central lateral positions, the swath will have a width that lies between the narrow and wide widths described above. It is also possible to arrange the guide plates asymmetrically, for example as shown in FIG. 8, in order to produce a swath that is located off-centre with respect to the swathing unit 15.

If a very wide swath is required, the inner guide plates 36LI, 36RI can be detached to provide a wider swathing aperture 54 between the inner edges of the outer guide plates 36LO, 36RO. Alternatively, all four of the guide plates 36 can be removed to provide wide spreading of the cut crop, wherein the swath width W3 is approximately equal to, or very slightly less than, the distance between the inner sides of the two drum cutters 8'. In this configuration the swath width W3 is at least 50% of the working width (the cutting width of the mower), and is preferably at least 60%, or more preferably at least 70%, of the working width, In the embodiment shown in the drawings the swath width W3 is about 75% of the working width. This allows for more rapid drying of the crop material.

Figure 14:
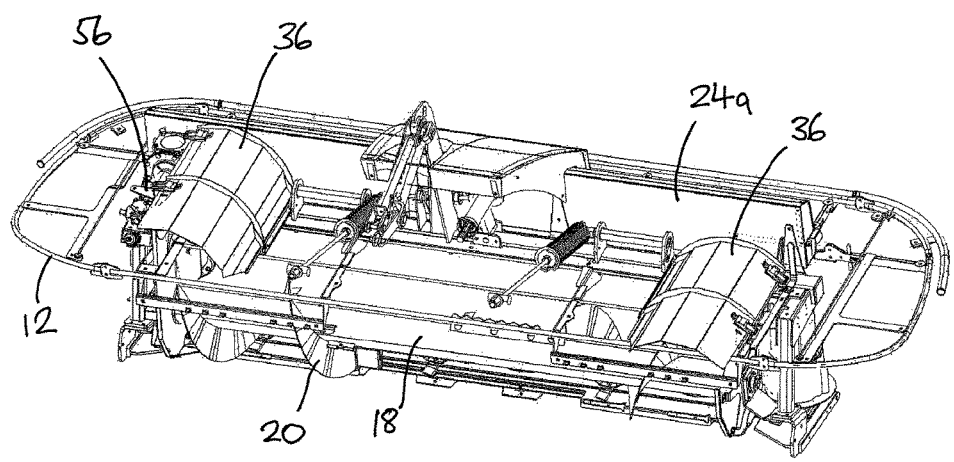
FIG. 14 is an isometric view showing the mower from above and from the rear.

Removing the guide plates 36 is a simple manual operation that involves undoing the locking clamps 48, pivoting the guide plates 36 downwards, sliding them sideways and then lifting them to disengage the locating flanges 44 from the locating slots 46. No tools are required to complete this operation. The removed guide plates 36 can be attached by mounting means 56 to the top of the mower unit for example as shown in FIGS. 4, 14 and 16 so that they can be transported with the mower.

In an alternative embodiment (not shown), the guide plates 36 are configured to rotate upwards, approximately around the axis D of the auger, to a non-operational position in which they located above the auger 16. When the guide plates 36 are located in this non-operational position the cut crop is able to pass freely beneath the auger 16 without being drawn sideways by the auger.

In the examples shown in the drawings the guide plates 36 are located at both ends of the swathing unit in order to produce a central swath. Alternatively, they may be located at only one end of the swathing unit in order to provide a swathing gap at the opposite end of the swathing unit 15. This may be useful for example in a wing mower mounted on one side of a tractor, which produces a swath that is combined with other swaths produced by a central mower and another wing mower in order to form a single combined swath.

In use, one or more mower units are attached to a tractor and connected to the power take-off unit which drives the rotary cutter heads 8 and the auger 16. As the tractor is driven through a field containing a crop such as grass the cutter heads 8 cut the crop and guide it rearwards towards the auger 16. The crop is captured by the downwards rotating auger 16 and passes underneath the rotational axis D of the auger 16.

The crop is held in close contact with the flightings 20 of the auger 16 by the guide plates 36. As the auger 16 rotates the flightings 20 draw the crop inwards towards the centre of the swathing unit 15, until it reaches the swathing aperture 54 between the inner ends of the guide plates 36. The auger 16 also draws the cut crop away from the cutter heads 8 ensuring optimum cutting quality. The fixed ejector plates 30 and, if fitted, the removable ejector plates 32 then eject the crop material through the aperture 54 to form a swath. The width of the swath can be selected by adjusting the positions of the guide plates 36 to adjust the width W and position of the swathing aperture 54. If a narrow swath is required the guide plates can be located in their laterally inner positions and if a wider swath is required the plates can be moved outwards to the central or outer lateral positions. Alternatively, if wide spreading of the crop material is required to the maximum width of the swathing unit 15 (and to at least 50% of the working width of the mower), the guide plates 36 can be removed and placed on top of the swathing unit 15.

Drive to the auger 16 is permanently maintained so that it rotates continuously while the cutter heads 8 rotate. This prevents a build-up of material around and beneath the auger 16. During wide spreading of the cut crop the guide plates 36 are removed allowing the cut crop to pass freely beneath the auger 16 onto the ground. In this case, although the auger continues to rotate it does not transport the crop laterally by a significant distance or consume a significant amount of power. Therefore, wide spreading of the cut crop material is achieved in an efficient manner.

Various modifications of the apparatus described above are possible. For example, fewer or more guide plates may be provided. The guide plates 36 may be arranged to pivot about vertical or approximately vertical axes to adjust the width of the swathing aperture 54, or may move by a combination of sliding and pivoting, instead of simply sliding laterally.

The invention claimed is:
1. A mower comprising:
a plurality of rotary cutters for cutting a crop, and
a swathing unit for forming a cut crop into a swath,
wherein the swathing unit comprises:

an auger having a rotary axis, and
   a housing that extends around at least part of the auger and provides a swathing aperture through which cut crop material is ejected to form the swath,
wherein the auger is configured such that a front part of the auger rotates downwards and the cut crop passes under the rotary axis of the auger, and
wherein the housing includes at least one guide plate that is located beneath and behind the auger and that holds the cut crop in contact with the auger, wherein said at least one guide plate can be adjusted to adjust the width of the swathing aperture, wherein the guide plate is removable to provide wide spreading of the cut crop, wherein the width of the swath is at least 50% of the mower working width, and
   mounting means for mounting the guide plate in a non-operation position after removal.

2. A mower according to claim 1, wherein the guide plate can be adjusted laterally to adjust the width of the swathing aperture.

3. A mower according to claim 1, wherein the guide plate is manually adjustable and includes a manually-operable locking mechanism.

4. A mower according to claim 3, wherein the guide plate includes a pivot mechanism located beneath the auger and a locking mechanism located behind the auger.

5. A mower according to claim 1, including an actuator that adjusts the position of the guide plate.

6. A mower according to claim 1, wherein the position of the guide plate is continuously adjustable.

7. A mower according to preceding claim 1, wherein the auger includes at least one flighting that rotates to shift a cut crop laterally with respect to a mowing direction.

8. A mower according to claim 7, wherein the auger is located above and behind the cutter heads, and wherein a front edge of the flighting is located in a transverse vertical plane that extends through the cutter heads.

9. A mower according to claim 1, wherein the auger includes one or more ejector plates that eject cut crop from the auger through the swathing aperture.

10. A mower according to claim 9, wherein the auger includes one or more adjustable and/or removable ejector plates.

11. A mower according to claim 1, wherein the auger is configured to be driven continuously with the rotary cutter heads.

12. A mower according to claim 1, wherein the swathing aperture is located substantially centrally between the ends of the swathing unit and the auger is configured to draw the cut crop inwards from the ends of the swathing unit towards the swathing aperture.

13. A mower according to claim 1, wherein the swathing aperture is located adjacent a first end of the swathing unit and the auger is configured to draw the cut crop from a second end of the swathing unit towards the swathing aperture.

14. A mower comprising:
   a plurality of rotary cutters for cutting a crop, and
   a swathing unit for forming a cut crop into a swath, wherein the swathing unit comprises:
      an auger, and
      a housing that extends around at least part of the auger and provides a swathing aperture through which cut crop material is ejected to form the swath, wherein the housing includes at least one guide plate that can be adjusted to adjust the width of the swathing aperture, wherein the guide plate is removable to provide wide spreading of the cut crop such that the width of the swath is at least 50% of the mower working width, and
   mounting means for mounting the guide plate in as non-operation position after removal.

15. A mower according to claim 14, wherein the guide plate can be adjusted laterally to adjust the width of the swathing aperture.

16. A mower according claim 14, wherein the guide plate is manually adjustable and includes a manually-operable locking mechanism.

17. A mower according to claim 14, including an actuator that adjusts the position of the guide plate.

18. A mower according to claim 14, wherein the position of the guide plate is continuously adjustable.

* * * * *